Jan. 2, 1968   A. D. STRUBLE, JR   3,361,387
BALLOON SYSTEMS
Filed March 4, 1965
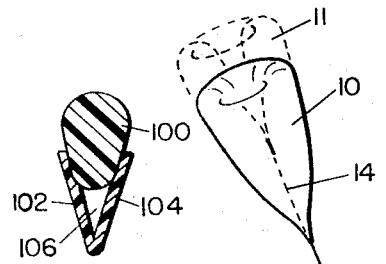
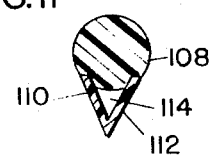
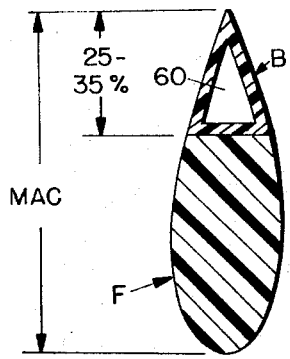
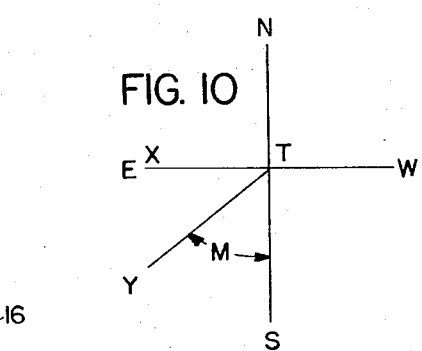
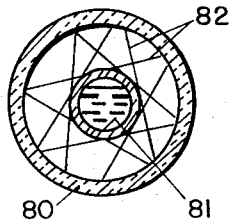
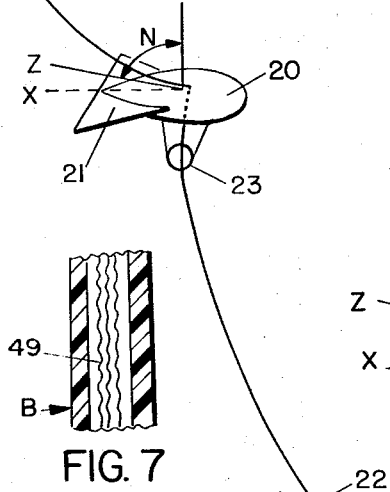
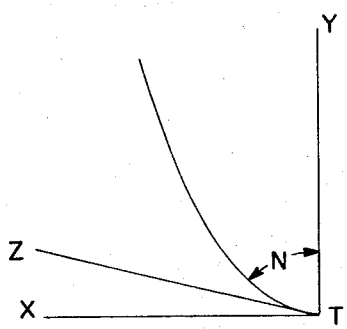
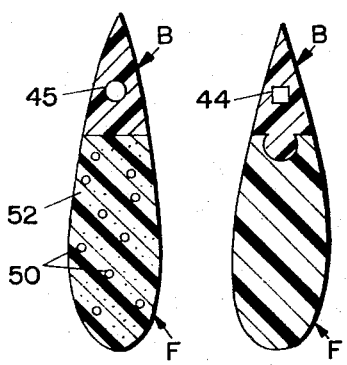
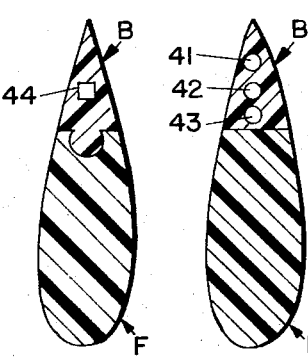
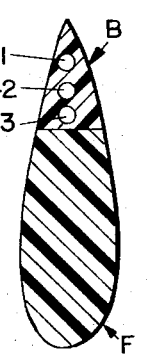
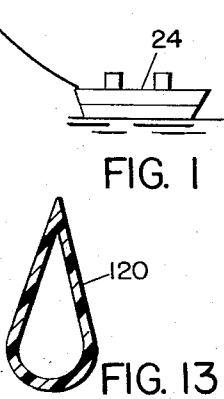
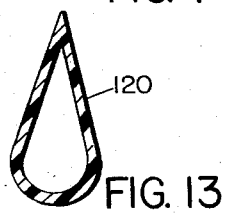

3,361,387
BALLOON SYSTEMS
Arthur D. Struble, Jr., 2101 Rosita Place,
Palos Verdes, Calif. 92266
Filed Mar. 4, 1965, Ser. No. 437,052
3 Claims. (Cl. 244—33)

This application is a continuation-in-part of my prior abandoned application Ser. No. 270,413, filed Apr. 3, 1963.

This invention relates generally to balloon systems. More specifically, this invention relates to the tethering and control of balloon systems.

This invention has as a principal object the provision of a controlled high altitude balloon system which may be used to gain useful information relative to the balloon's immediate surroundings as well as the land, sea and sky area within sight of the balloon.

One embodiment of this invention has as its object the provision of a high altitude reconnaissance vehicle which has mobility and is controllable from a point beyond the vicinity which can be effectively examined by the reconnaissance instruments.

A further object of the invention is to provide a reconnaissance vehicle which is substantially undetectable by conventional radar systems.

Another object of this invention is to provide a balloon cable which has improved stability when subjected to high wind velocities.

A further object of the present invention is to provide a method for determining the position of a tethered balloon through the use of known information, such as the length of the tether cable, the curvature of the cable, its angle with respect to a vertical axis, its azimuthal angle, and its tension.

Other objects and advantages of the invention will become more apparent from the following description and the appended drawing wherein:

FIGURE 1 is a view showing the overall relationship of the components of a balloon system in accordance with this invention;

FIGURES 2-6 are cross-sectional views of several embodiments of cable means in accordance with this invention;

FIGURE 7 is a view illustrating the disposition of conductors within a slot of a cable means in accordance with this invention;

FIGURE 8 is a cross-sectional view of a Dewar arrangement in accordance with one embodiment of this invention;

FIGURES 9 and 10 are sketches illustrating positional relationship determination in accordance with this invention;

FIGURES 11, 12 and 13 are cross sectional views of several other cable means in accordance with this invention.

One aspect of the invention encompasses a balloon system comprising in combination:
 (a) An inflated balloon,
 (b) Tethering means having one end connected to said balloon and the other end connected to a tethering point remote from said balloon,
 (c) Said tethering means including cable means having a cross section generally approximating a streamlined teardrop having a relatively wide rounded front section and a relatively narrow pointed back section.

(A)

The inflated balloon may take a variety of shapes and sizes. A simple, streamlined, cylindrical shape with rounded ends such as is shown in FIGURE 1 is quite suitable, although balloons having other configurations (such as relatively flat wing shaped structures) could be utilized.

A preferred balloon design in accordance with this invention is one which has a shape generally resembling an arrow, the narrow portion being at the front end and the wide portion being at the rear (from a plan view). The narrow front end of the balloon may contain a section which is filled with high pressure lifting gas and this section is better able to resist wind forces. Such a balloon, if designed properly, can act very much as a wing. When viewed in cross section such a balloon may have one or more sections which are concave in a downward direction.

The balloon envelope is preferably made of one or more layers of very thin plastic material so that the balloon will be able to achieve an altitude of from 100,000 to 150,000 feet. However, other balloon fabric materials can be used. The balloon should be large enough to support the weight of whatever instruments (or men) are to be carried by the balloon and also at least a portion of the load imposed by the tethering means. Balloon 10 is shown in FIGURE 1.

In order for the balloon to maintain its shape under varying wind conditions, the balloon must be superpressured to resist the wind pressures built up on the nose of the balloon. If this is not done the balloon will "dish" and will assume a flattish shape and "dishing" will in turn catch more wind and compound the problem. Without superpressuring and the elimination of "dishing" the overall lift capacity of the balloon will be degraded.

When it is desired that the balloon remain aloft for a long period of time the replacement of the balloon lifting gas which gradually leaks through the balloon envelope becomes a necessity. One method of replacing the balloon leakage is to use a Dewar-type container to hold liquid hydrogen or liquid helium and the Dewar-type container would preferably be positioned within the interior of the balloon. The boil-off rate of the Dewar would be designed and controlled so that it would more or less match the leakage rate of the balloon envelope. Relatively inexpensive plastic containers that can maintain a supply of liquid hydrogen for an extended period, i.e. one to two months, could be used. Such containers could comprise (see FIGURE 8) an outer shell 80 comprising a suitable thickness of insulation and an interior plastic shell 81, preferably spherical in shape, made of Teflon which is silvered. This inner sphere 81 (which contains the liquid hydrogen) could be supported within an annular shell of insulation 80 and spaced therefrom by a plurality of small Teflon wires 82 which radiate tangentially from the interior of the shell of insulation 80 around the exterior of plastic shell 81. Support of this type is similar to the utilization of spokes in a wheel wherein all members are in tension.

The balloon may be provided with stabilizing fins or other means to aid in a desired orientation of the balloon. (The balloon with fins will stabilize into the wind.)

(B)

The aforesaid balloon is restricted and guided in horizontal and vertical directions by a tethering means. The upper end of the tethering means is attached to the balloon and the lower end of the tethering means is either attached to a moving or fixed point on land, sea, or air. More specifically, the lower tethering point for the tethering means may consist of an airplane, a blimp, a helicopter, another balloon, a ship, a buoy, a truck, a train or a fixed anchoring point on the ground. A stationary lower tethering point is sufficient for some purposes but where movement of the balloon is desired a moveable lower tethering point is necessary.

FIGURE 1 shows the balloon 10 which is tethered to a second balloon 20 by a first tethering means 16, balloon 20 in turn being tethered to a ship 24 by means of a second tethering means 22. Movement of ship 24 will in turn cause movement of both balloons 10 and 20, but not necessarily always in exactly the same direction and distance (because of high altitude wind conditions which might be encountered). Any number of tethering means and intermediate balloons can be used. The upper end of the first tethering means 16 may be joined to balloon 10 with a plurality of separate lines 14 in order to assist in orienting the balloon as desired.

The tethering means can be in sections, the sections preferably being joined to each other by swivel-type joints (e.g. ball and socket). Each section does not need to be made of the same material, nor have the same strength. Much will depend upon the altitude to which the balloon is to rise, the length of the entire tethering means, the anticipated cross winds and other weather conditions, the length of time that the balloon is to be in the air, etc. Normally the cable will be stronger and heavier in the uppermost sections in order to support the cumulative cable weight; it generally will taper from a small size at the lower end to a larger size near the balloon. Intermediate balloons will allow this tapering to be repeated thereby reducing the overall cable weight.

A multi-balloon support of the tethering cable is important in order to achieve a small system as compared to a single balloon at altitude. Specifically, the use of several balloons allows the cable size to be smaller since it stops the tapering process.

(C)

It is preferred that at least a substantial portion of said tethering means be comprised of cable means having a cross section generally approximately a streamlined teardrop having a relatively wide rounded front section and a relatively narrow pointed trailing edge section. A cable means of this type is preferred over the usual type of cable having a circular cross section because cables having a circular cross section will exhibit much greater drag characteristics in the atmosphere. In other words, if a cable having a circular cross section is utilized as the tethering means the force of wind against such a cable will cause the balloon to be displaced at a greater distance away from a perfectly vertical position than would be the case if a cable means in accordance with this invention were used. Since the cable means of this invention has a streamlined teardrop shape it has minimum wind drag characteristics and the wind has less tendency to "push it over." In the more extreme altitude cases the streamline cables result in the only practical solution since a round cable will have too much drag and consequent weight making the entire system spiral in size upwards to the extent that it becomes impractical.

The simplest form of a streamlined teardrop-shaped cable means in accordance with this invention is illustrated in FIGURE 2. It consists of two separate sections, a front section F and a back section B. The front section F has a rounded front surface and is of greater strength than the back section B (which has a generally triangular cross section). The front section F is preferably constructed of a plurality of high strength fibers of plastic or metal material (such as nylon, Dacron, polyethylene, polypropylene, high carbon steel or the like) embedded in a plastic matrix (such as an epoxy resin, polyester or adhesive) so that the strength fibers will be adhered and bound together permanently. The back section B preferably is constructed so that it has a lower weight per unit volume than said front section, since this results in better overall aerodynamic behavior of the cable. For example the back section B may comprise foamed plastic materials (such as polyurethane, polyethylene, polystyrene, polyvinyls, etc.). If desired, the exterior surfaces of the back section B may be coated or laminated with a thin relatively hard material so as to provide extra protection to the back section when it is soft and likely to be damaged during the reeling in or reeling out operations.

It is important to control the relative sizes of the front and back sections in order to avoid "flutter" along the length of the cable. It has been found desirable to adjust the sizes and weights of the two sections so that the center of gravity is located at a point between about one-sixth to one-third of the way along the mean aerodynamic chord of the cable, as measured, from front to back. (The mean aerodynamic chord is found by drawing a line from the center of the front edge to the center of the trailing edge.)

The above-described cable means need not be of uniform cross sectional area along its entire length from its very bottom to its very top. Since wind velocities are known to vary at different altitudes the cross sectional area of the cable as well as its precise curvature may be changed along its length. The strength of the cable means may also be varied along its length by using more or less reinforcing elements or by employing different plastic materials.

The front section F of the cable means may be strengthened by the inclusion of reinforcing elements. These reinforcing elements preferably comprise high strength fibers embedded in the plastic matrix of the front section. In FIGURE 5, reinforcing elements 50 are shown as being embedded in the plastic matrix 52 of the front section F. For those uses where the presence of metal in or adjacent to the balloon structure is not objectionable, metal wires, filaments or threads could be used in place of plastic fibers as strengthening means. It is preferred that the reinforcing fibers or the metallic element used in the front section of the cable means be positioned generally parallel to each other and not twisted with respect to each other. Fibers and filaments which are not twisted with respect to each other (i.e. that are longitudinally oriented) offer the advantage that the filaments and fibers can be made shorter if they are not twisted and also this arrangement minimizes torque forces and does not degrade the fiber strength. Since the overall configuration of the cable means is in the form of a streamlined teardrop the entire cable will usually not twist around a great deal as the balloon is ascending and will instead orient itself with respect to the wind.

The back section B of the cable means may be used to house information transmission means such as conductor wires or cables. It is preferred that such conductors not be simply embedded in the back section. Instead it is preferred that the back section be provided with one or more slots or channels such as 41–45 in FIGURES 3–5, and then the desired conductor or conductors placed therein. It is further preferred that the conductors in such slots or channels be rather loosely disposed therein so that as the cable means twists, turns and is reeled and unreeled, undue tension or strain will not be placed on the conductors. The conductors are preferably fixed at spaced locations in the back section (by adhesion or other fastening means), but between said spaced locations the conductor or conductors should be extensible. FIGURE 7 illustrates the manner in which conductors 49 could be "snaked" or coiled back and forth so as to permit longitudinal extensibility.

The back section of the cable means can also be constructed so that it essentially comprises a hollow passageway 60, as is illustrated in FIGURE 6. This is of course a light-weight back section. Such a back section could easily be formed from plastic extrusion processes. The passageway 60 could, if desired, be used to carry inflation gases to the balloon to compensate for the gas which is gradually lost by diffusion through the balloon envelope. A light gas in passageway 60 could also be used to partially support the weight of the cable means itself.

The cable means of this invention could be manufactured in a number of different ways. For example, the front and back sections could be produced separately (e.g. by extrusion) and then joined together with a strong adhesive. Alternatively, the front and back sections could be extruded simultaneously (but from different supplies of plastic) and shortly after extrusion, and while still hot and plastic, the two extruded sections could be pressed together to effect a permanent fused interface. Tongue and groove constructions are also possible as generally illustrated in FIGURE 4. When the cable means is to include conductors it is possible to either incorporate the conductors during the extrusion process or to insert them later into the slots or channels provided for.

*Reconnaissance*

While the balloon system of this invention has a wide field of application it is particularly suited for military reconnaissance. In the interests of brevity, the invention will be described with reference to one specific utility, namely that of photographing an enemy coastline, but it will be understood that the invention is not limited thereto.

Referring to FIGURE 1 the illustrated ship and balloon system may be used to achieve undetected aerial photography of a coastal area which is up to fifty miles away from the ship. In order to accomplish this, the balloon 10 is preferably launched from the ship so that the prevailing winds will carry it toward the desired coastal area. If the balloon fabric is sufficiently light and other aerodynamic factors are favorable, the balloon 10 may attain an altitude of from 100,000 to 150,000 feet. Although an intermediate balloon 20 is not necessary, it is preferred. Intermediate balloon 20 may operate at 60,000 to 80,000 feet and be as far as 20 miles away from the ship 24. Thus, it is seen that the balloon 10 could be stationed directly over the coastal area of any enemy country with the intermediate balloon 20 being 30 miles from the coastal area and the ship 24 being 50 miles from the coastal area.

Balloon 10, which is directly over the coastal area, is so high that it cannot be seen and cannot be reached by ordinary military aircraft. Balloon 20 is also out of sight and near the upper limit of most military aircraft. If the appropriate photographic equipment is included in the balloon 10 then it is possible to periodically or continuously obtain photographs of an enemy coastal area. Such information can of course be quite valuable and involves a minimum of risk insofar as equipment is concerned and no risk whatsoever insofar as military personnel having to be over enemy territory is concerned. If the balloon simply contains photographic equipment which is arranged to automatically take a series of photographs at periodic intervals, the balloon 10 can be raised and then lowered when it has accomplished its photographic mission (that is, after a specified interval of time).

However, it will be apparent that there will frequently be times when it is desirable to have someone on the ship activate or otherwise control the information gathering system contained within the balloon 10. For example, if the balloon 10 contains photographic equipment, it may be desirable for the photographic equipment to only operate when it is ascertained that the area to be photographed is free of cloud cover and has sufficient light. It would therefore be desirable for a person on the ship 24 to be able to control the camera in balloon 10 so as to stop it from operating when there was insufficient light or excessive cloud cover at the enemy coastal area. Also, it will be appreciated that since the balloon is constantly shifting about it might be desirable to only activate the cameras in the balloon when they were focused on a specific segment of the broad coastal area beneath the balloon. Accordingly, in order for a person on the ship to either obtain information from the balloon or to control the action of the balloon or its equipment some communication means must be established between the ship and either or both of the aforesaid balloons.

With a cable means of the type shown in FIGURE 2 no communication *through the cable means* to either of the balloons is possible. However, if a cable means such as is shown in FIGURE 3, 4 or 5 is employed, it is possible for communication to be established through the cable means by virtue of the conductors located within the slots or channels 41–45. Any number of conductors can of course be used and they can either "read out" information obtained by the balloon (e.g. television pictures) or the conductors can carry electrical energy to control either the movement of the balloon or the action of the information gathering instruments contained within the balloon. It is believed that the various possibilities in this regard will be obvious to those skilled in this art.

The only disadvantage of having conductor wires in the cable means is that there is the possibility that such metallic members could be detected by radar or equivalent instruments employed by the enemy and once the enemy knew the disposition of the cable means 16 they might be able to direct a high-altitude rocket toward the specific location of balloon 10 and destroy it. It is also possible that rockets themselves (carrying very sensitive instruments) might be able to detect a cable means containing a metallic conductor and thus seek out and destroy the cable means and/or the balloon.

One means of minimizing the dangers of enemy detection due to the presence of metallic conductors is to at least eliminate all metallic conductors from the cable means 16. In other words, a cable means such as is shown in FIGURE 2 would be used at 16. The problem would then be as to how one could feed instructions to and receive information from the instruments contained in balloon 10. According to this invention I have found that this can be accomplished in a unique fashion.

*Balloon position determination*

Referring again to FIGURE 1, let us assume that the cable means 16 is constructed in accordance with FIGURE 2 and the cable means 22 is constructed in accordance with either FIGURE 3, 4 or 5. In other words, the cable means 16 contains no metallic conductor elements but the cable means 22 does. It is therefore possible for a person on the ship 24 to send information to the balloon 20 and to receive information therefrom along cable means 22 by virtue of the conductor elements therein.

By placing appropriate instruments 23 in balloon 20 it is possible to determine the precise location of balloon 10. For example, an appropriate instrument attached to balloon 20 can determine the angle between the vertical axis of balloon 20 and a tangential line Z which is tangential to the cable means 16. This angle has been indicated as angle N (see FIGURES 1 and 9). A second angle which an instrument in the balloon 20 may determine is the angle M which is the azimuthal angle of the cable means 16 (see FIGURE 10). (Instruments for the aforementioned purposes are well known and commercially available.)

The azimuthal angle M of cable means 16 will give the horizontal direction of the cable 16 and thus it may be determined whether the balloon 10 is north, south, east or west relative to the balloon 20.

Another instrument can measure the tension of the cable means 16. With a knowledge of this tension, the known length and weight of the cable means 16 and the angles M and N, it is possible to determine the precise location of balloon 10. For example, the above information can be fed downwardly through cable means 22 to a computer located in ship 24 and the computer can then determine the precise position of balloon 10.

Once the precise position of balloon 10 is known, and particularly in relation to balloon 20, this information can be utilized to either readjust the position of balloon 10 or to activate the equipment carried by balloon 10. One such means of accomplishing this might be to equip balloons 10 and 20 with relatively narrow beamed receiving and transmitting sets. Thus, when the exact position of balloon 10 was ascertained by a computer a transmitter in balloon 20 could be instructed to orient itself so that a narrow beam of transmitted energy would be focused upwardly upon balloon 10. The beam of energy could contain instructions to the equipment in balloon 10, such as whether or not to take pictures and whether or not to transmit them. Even more specifically, a transmitter in balloon 20 could be focused directly upon balloon 10 and it could instruct instruments in balloon 10 to orient a transmitter in balloon 10 so that it would point a narrow beam of energy directly toward balloon 20. When the transmitter in balloon 10 was properly aligned, information obtained or stored by the instruments in balloon 10 could then be transmitted in a narrow beam to a receiver in balloon 20 and this received in balloon 20 could in turn relay the information through cable means 22 to ship 24. Alternatively, a transmitter in balloon 20 could focus a narrow beam of energy at the ship 24 and transmit the received information in this fashion.

So long as the system is arranged so that transmitted beams of energy are relatively narrow and carefully directed there is little danger that enemy forces could intercept or even be aware of such transmissions. A number of energy forms are possible including infra red, electromagnetic, electrostatic, light, laser, nuclear, radio, radar, etc.

It will be obvious to those skilled in the art that many possibilities and variations of the above system can be utilized.

For example, in FIGURE 11 it is seen that a streamlined cable may be formed by combining a front section 100 (made of plastic and having a round or oblong shape) with two rearwardly extending tapes 102 and 104. As shown the upper ends of tapes 102 and 104 are attached to the sides of the front section (e.g. with epoxy adhesives) and the rear ends of the tapes 102 and 104 may be adhered together so as to form a hollow chamber 106. A very similar arrangement is shown in FIGURE 12, the main difference being that the front section 108 is more round and has slots cut in its surface to accommodate the tapes 110 and 112 and form the chamber 114. The tapes shown in FIGURES 11 and 12 are preferably thin and fairly stiff. They may be made of plastic and reinforced with fibre glass. The hollow channels 106 and 114 could be filled with a very light weight foamed plastic if desired. They could also carry wires such as shown at 49 in FIG. 7. The front portions 100 and 108 could be reinforced with high strength fibers as is shown in FIGURE 5.

It should further be noted that when high strength reinforcing fibers (such as nylon) are embedded in a plastic matrix to form a cable, the number of fibers may be varied along the length of the cable so that the cable will get progressively stronger from one end to the other. This possibility may be combined with the previously mentioned idea of varying the total cross sectional area of the cable along its length.

Still another embodiment of my invention involves providing an extruder which will always extrude an outer skin 120 of streamline shape. Simultaneously with this extrusion, or subsequent to it, the space within the skin 120 may be filled with one or more other materials. Such other materials could for instance include (a) the aforesaid high strength fibers of plastic or metal material and/or (b) a plastic matrix and/or (c) light weight foamed plastic materials of the aforesaid type. More specifically the interior of the skin could for example initially be half filled with foamed plastic material and half filled with high strength fibers embedded in a matrix. This 50–50 ratio could progressively change to a 60–40 ratio or a 90–10 ratio. It will be seen that there are many possibilities in this regard. Skin 120 could be made from a flat sheet of plastic rather than by extrusion by joining two edges of the sheet together. The skin 120 may be made of either rigid or flexible plastic material. The advantage of having the skin 120 flexible is that when wound on a reel within a sheath the skin can easily conform to the sheath cavity. Also, according to another embodiment the high strength fibers may be merely loosely packed with the skin 120—or in other words the high strength fibers need not be embedded in a matrix. This saves some weight and permits at least limited movement relative to each other.

According to still another embodiment of the invention, the cable need not have a perfectly teardrop shape. It can be squared off somewhat at the trailing edge rather than being pointed, and this can have advantages insofar as winding and reeling procedures are concerned, particularly where the reel utilizes a sheath of uniform cross sectional area.

What I claim is:
1. A balloon system comprising in combination:
 (a) an inflated balloon,
 (b) said balloon having a shape generally resembling an arrow, the narrow portion being at the front end and the wide portion being at the rear, said narrow front end portion containing a section which is superpressured with a high pressure lifting gas so as to resist the wind pressures built up on the nose of the balloon,
 (c) a tethering means having one end connected to said balloon and the other end connected to a tethering point remote from said balloon,
 (d) said tethering means including cable means having a cross section generally approximating a streamlined teardrop having a relatively wide rounded front section comprising reinforcing high strength fibres embedded in plastic and light-weight back section having channels for electrical conductors.

2. A system according to claim 1 wherein said balloon contains a reservoir of liquid hydrogen or helium within the confines of the balloon envelope.

3. A balloon system comprising in combination
 (a) a first inflated balloon located above a second balloon and joined thereto,
 (b) a tethering means having one end connected to said second balloon and the other end connected to a mobile tethering point remote from said balloon,
 (c) said tethering means including cable means having a cross section generally approximating a streamlined teardrop having a relatively wide rounded front section and a relatively narrow pointed back section,
 (d) the said front section of said cable means being formed of a material having greater strength than said back section,
 (e) transmission means within said tethering means for transmitting electrical signals from said second balloon to said mobile base, and
 (f) location determining means within said second balloon for determining the position of said first balloon.

References Cited

UNITED STATES PATENTS

| | | |
|---|---|---|
| 1,424,491 | 8/1922 | Langevin. |
| 2,365,778 | 12/1944 | Schwab _____ 244—33 X |
| 2,435,956 | 2/1948 | Craig _____ 244—130 X |
| 2,476,678 | 7/1949 | Miller _____ 244—33 |
| 2,891,501 | 6/1959 | Rather _____ 114—235 |
| 2,960,298 | 11/1960 | Jones _____ 244—33 X |
| 3,058,692 | 10/1962 | Madden _____ 244—3 |
| 3,088,539 | 5/1963 | Mathues et al. _____ 180—90 |

FOREIGN PATENTS

| | | |
|---|---|---|
| 41,141 | 11/1887 | Germany. |
| 4,433 | 1910 | Great Britain. |

MILTON BUCHLER, *Primary Examiner.*

FERGUS S. MIDDLETON, *Examiner.*

T. MAJOR, *Assistant Examiner.*